F. WILLCOX.
Domestic Boiler.
No. 89,189.                               Patented April 20, 1869.
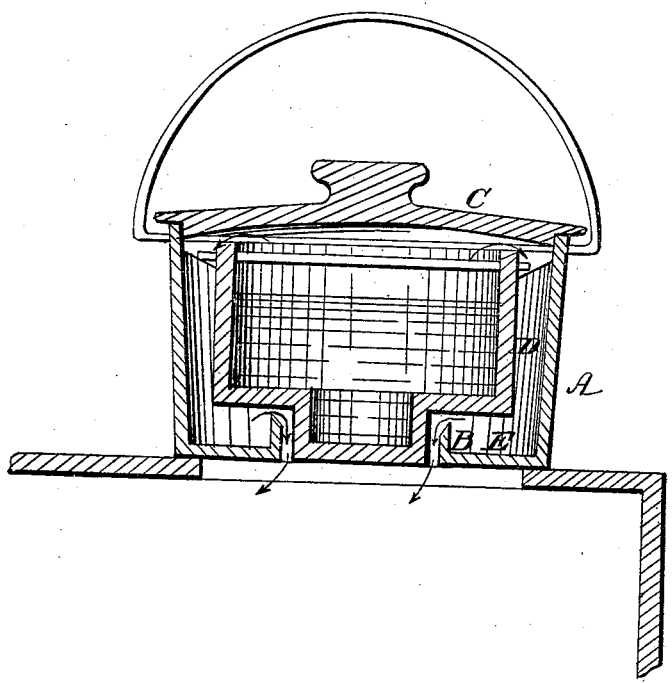
Witnesses
A Benneckendorf.
Wm A Morgan.
Inventor.
Fenn Willcox.
per. Munn&Co

FENN WILLCOX, OF NEWARK, NEW JERSEY.

Letters Patent No. 89,189, dated April 20, 1869.

CULINARY-BOILER.

The Schedule referred to in these Letters Patent and making part of the same.

*To all whom it may concern:*

Be it known that I, FENN WILLCOX, of Newark, in the county of Essex, and State of New Jersey, have invented a new and useful Improvement in Boilers, for Cooking and other purposes; and I do hereby declare that the following is a full, clear, and exact description thereof, which will enable others skilled in the art to make and use the same, reference being had to the accompanying drawings, forming part of this specification.

This invention relates to that class of culinary-apparatus which is composed of two vessels, placed one within the other, and closed with a tightly-fitting cover, whereby the steam, arising from the articles being boiled or cooked in the inner vessel, is directed into the stove, and not permitted to escape into the room. And It consists in the arrangement of one vessel within the other, having an annular space at its bottom for receiving the water of condensation, and preventing its escaping to the fire, as will be hereinafter more fully described.

The drawing represents a sectional elevation of my improvement.

I employ an outer vessel, A, arranged to sit over the hole in the top of the stove, or range, or it may, if preferred, sit therein.

It is provided with a hole through the bottom, and a slotted, or perforated flange, B, rising around the same; also, with a tight cover, C, which will prevent the escape of steam into the room.

D represents an interior boiling-vessel, having a cylindrical, or other-formed extension projecting into or through the hole in the bottom of the vessel A, and resting on the top of the flange B.

The articles to be boiled are placed therein, together with the water, and the steam which escapes is forced to pass down, through the opening of the bottom of the vessel A, into the fire, and escape with the product of combustion.

E represents an annular space, formed by the outer wall of the vessel A and the flange B. This space serves to receive the water of condensation, formed by the contact of the steam with the sides of the vessels A D, and prevent its escaping through the openings in the flange B, to extinguish the fire.

The water collected in the space E can be readily discharged by removing one vessel from the other, and pouring the water from the vessel A into any suitable receptacle.

I am aware that culinary-boilers have heretofore been made of two vessels, set one within the other, and arranged in such a manner as to direct the steam arising from the articles being cooked, into the fire; but this I do not claim.

What I do claim as new, and desire to secure by Letters Patent, is—

The vessels A D, arranged one within the other, when the annular space E is formed between the outer wall of the vessel A and the flange B, to receive the water of condensation, and prevent its escape to the fire, as herein shown and described The above specification of my invention signed by me, this 2d day of January, 1869.

FENN WILLCOX.

Witnesses:
FRANK BLOCKLEY,
ALEX. F. ROBERTS.